(12) United States Patent
Iizuka et al.

(10) Patent No.: US 8,852,047 B2
(45) Date of Patent: *Oct. 7, 2014

(54) AUTOMATIC TRANSMISSION

(71) Applicant: Honda Motor Co., Ltd., Tokyo (JP)

(72) Inventors: Kohei Iizuka, Wako (JP); Soichi Sugino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,832

(22) Filed: Mar. 5, 2013

(65) Prior Publication Data

US 2013/0244822 A1 Sep. 19, 2013

(30) Foreign Application Priority Data

Mar. 13, 2012 (JP) .................................. 2012-056020

(51) Int. Cl.
*F16H 3/62* (2006.01)
*F16H 3/66* (2006.01)

(52) U.S. Cl.
CPC .......... *F16H 3/62* (2013.01); *F16H 2200/2012* (2013.01); *F16H 3/66* (2013.01); *F16H 2200/0069* (2013.01); *F16H 2200/2048* (2013.01)
USPC ........... 475/276; 475/278; 475/279; 475/281; 475/288; 475/290; 475/291; 475/311; 475/317; 475/323

(58) Field of Classification Search
CPC .......... F16H 3/66; F16H 3/663; F16H 3/666; F16H 2200/0069; F16H 2200/2048; F16H 2200/2012; F16H 2200/2084
USPC .................................................. 475/275, 276
See application file for complete search history.

(56) References Cited

U.S. PATENT DOCUMENTS

| | | | |
|---|---|---|---|
| 2008/0248913 A1* | 10/2008 | Kato et al. ..................... | 475/276 |
| 2012/0108382 A1* | 5/2012 | Saitoh et al. .................. | 475/276 |
| 2013/0244823 A1* | 9/2013 | Iizuka et al. .................... | 475/59 |
| 2013/0244826 A1* | 9/2013 | Iizuka et al. .................. | 475/276 |

FOREIGN PATENT DOCUMENTS

| | | |
|---|---|---|
| JP | 2000-161450 | 6/2000 |
| JP | 2001-182785 | 7/2001 |
| JP | 2002-323098 | 11/2002 |
| JP | 2005-273768 | 10/2005 |

* cited by examiner

*Primary Examiner* — Edwin A Young
*Assistant Examiner* — Colby M Hansen
(74) *Attorney, Agent, or Firm* — Mori & Ward, LLP (57) ABSTRACT

An automatic transmission includes an input shaft, first to fourth planetary gear mechanisms and first to seventh engagement devices. Ten forward gears of the automatic transmission are established by bringing at least three of the first to seventh engagement devices into an engagement state.

12 Claims, 5 Drawing Sheets

|      | B1 | B2 | B3 | B4 | C1 | C2 | C3 |
|------|----|----|----|----|----|----|----|
| Rvs  |    | O  | O  |    |    | O  |    |
| 1st  |    | O  | O  |    |    |    | O  |
| 2nd  |    |    | O  |    |    | O  | O  |
| 3rd  | O  |    |    |    |    | O  | O  |
| 4th  |    | O  |    |    |    | O  | O  |
| 5th  |    |    |    |    | O  | O  | O  |
| 6th  |    | O  |    |    | O  |    | O  |
| 7th  |    | O  |    |    | O  | O  |    |
| 8th  | O  | O  |    |    | O  |    |    |
| 9th  | O  |    |    |    | O  | O  |    |
| 10th |    |    |    | O  | O  | O  |    |

FIG. 3B

|      | GEAR RATIO |
|------|------------|
| Rvs  | 3.754      |
| 1st  | 5.028      |
| 2nd  | 3.137      |
| 3rd  | 2.072      |
| 4th  | 1.424      |
| 5th  | 1.000      |
| 6th  | 0.915      |
| 7th  | 0.687      |
| 8th  | 0.581      |
| 9th  | 0.559      |
| 10th | 0.490      |

FIG. 3C

|       | COMMON RATIO |
|-------|--------------|
| 1-2   | 1.603        |
| 2-3   | 1.514        |
| 3-4   | 1.455        |
| 4-5   | 1.424        |
| 5-6   | 1.093        |
| 6-7   | 1.331        |
| 7-8   | 1.183        |
| 8-9   | 1.040        |
| 9-10  | 1.140        |

FIG. 3D

| GEAR RATIO h | 3.157  |
|--------------|--------|
| GEAR RATIO i | 2.527  |
| GEAR RATIO j | 3.064  |
| GEAR RATIO k | 1.387  |
| RATIO RANGE  | 10.256 |

AUTOMATIC TRANSMISSION

CROSS-REFERENCE TO RELATED APPLICATIONS

The present application claims priority under 35 U.S.C. §119 to Japanese Patent Application No. 2012-056020, filed Mar. 13, 2012, entitled "Automatic Transmission." The contents of this application are incorporated herein by reference in their entirety.

BACKGROUND OF THE INVENTION

1. Field of the Invention

The present disclosure relates to an automatic transmission.

2. Discussion of the Background

There is a known automatic transmission capable of providing eight forward gears using a first planetary gear mechanism for input, two planetary gear mechanisms consisting of second and third planetary gear mechanisms for changing the speed, and six engagement mechanisms (see, for example, Japanese Unexamined Patent Application Publication No. 2005-273768).

In the automatic transmission described in Japanese Unexamined Patent Application Publication No. 2005-273768, the planetary gear mechanism for input is a double-pinion planetary gear mechanism that includes a first sun gear, a first ring gear, and a first carrier that supports a pair of first pinions. The pair of first pinions mesh with each other, one of the first pinions meshes with the first sun gear, and the other meshes with the first ring gear. The first carrier supports the first pinions such that they are rotatable about their respective axes and about the axis of the first sun gear. This double-pinion planetary gear mechanism is also called a plus planetary gear mechanism or positive planetary gear mechanism because when the carrier is fixed the sun gear and ring gear rotate in the same direction. When the ring gear is fixed the sun gear and carrier rotate in different directions.

In the first planetary gear mechanism, the first sun gear is a fixed element fixed to a transmission case, the first carrier is an input element coupled to the input shaft, and the first ring gear is an output element that reduces the rotational speed of the first carrier, which is the input element, and outputs the rotation.

The two planetary gear mechanisms for changing the speed are of Ravigneaux type made up of a second sun gear, a third sun gear, a second ring gear integral with a third ring gear, and a second carrier that supports a pair of second pinions. The pair of second pinions mesh with each other, one of the second pinions meshes with the second sun gear and second ring gear, and the other meshes with the third sun gear. The second carrier supports the second pinions such that they are rotatable about their respective axes, one of the second pinions is rotatable about the second sun gear, and the other is rotatable about the third sun gear.

In a collinear diagram (a diagram that illustrates a ratio among relative speeds of rotational elements using straight lines), the elements of the above-described Ravigneaux planetary gear mechanisms are arranged at intervals corresponding to the gear ratios such that they are defined as a first rotational element, a second rotational element, a third rotational element, and a fourth rotational element in sequence. In this case, the first rotational element is the second sun gear, the second rotational element is the second carrier integral with the third carrier, the third rotational element is the second ring gear, which is integral with the third ring gear, and the fourth rotational element is the third sun gear.

The automatic transmission further includes, as the engagement mechanisms, a first wet multi-plate clutch that releasably couples the first ring gear being the output element of the first planetary gear mechanism and the fourth rotational element consisting of the third sun gear, a second wet multi-plate clutch that releasably couples the input shaft and the second rotational element consisting of the second carrier, a third wet multi-plate clutch that releasably couples the first ring gear being the output element and the first rotational element consisting of the second sun gear, a fourth wet multi-plate clutch that releasably couples the first carrier being the input element and the first rotational element consisting of the second sun gear, a first brake that releasably fixes the first rotational element consisting of the second sun gear to the transmission case, and a second brake that releasably fixes the second rotational element consisting of the second carrier to the transmission case.

With the above-described configuration, the first gear is established by engagement between the first wet multi-plate clutch and the second brake, the second gear is established by engagement between the first wet multi-plate clutch and the first brake, the third gear is established by engagement between the first wet multi-plate clutch and the third wet multi-plate clutch, and the fourth gear is established by engagement between the first wet multi-plate clutch and the fourth wet multi-plate clutch.

The fifth gear is established by engagement between the first wet multi-plate clutch and the second wet multi-plate clutch, the sixth gear is established by engagement between the second wet multi-plate clutch and the fourth wet multi-plate clutch, the seventh gear is established by engagement between the second wet multi-plate clutch and the third wet multi-plate clutch, and the eighth gear is established by engagement between the second wet multi-plate clutch and the first brake.

The known automatic transmission typically has eight rows along the axis of the input shaft. Specifically, in sequence from the torque converter side, the fourth clutch and the first brake are arranged in the first row, the first planetary gear mechanism is in the second row, the first clutch is in the third row, the third clutch is in the fourth row (the third clutch is seen in the same row as that of the first planetary gear mechanism in a skeleton diagram, but actually they are in different rows because the piston and oil passage for use in the third clutch is present between the first clutch and the output gear), the output gear is in the fifth row, the second planetary gear mechanism is in the sixth row, the third planetary gear mechanism is in the seventh row, and the second clutch and the second brake are in the eighth row.

In the above-described known example, the number of engagement mechanisms being engaged at each gear is two. Thus, the above-described automatic transmission has the disadvantage of a large friction loss resulting from dragging of the remaining four opened engagement mechanisms and a decreased efficiency of the automatic transmission.

In addition, to achieve 10 forward gears, it is necessary to add at least one engagement mechanism. In this case, the number of engagement mechanisms that are opened at each gear is five or more, and the friction loss further increases.

SUMMARY OF THE INVENTION

According to one aspect of the present invention, an automatic transmission includes an input shaft, a first planetary gear mechanism, a second planetary gear mechanism, a third planetary gear mechanism, a fourth planetary gear mechanism, a first engagement device, a second engagement device, a third engagement device, a fourth engagement device, a fifth engagement device, a sixth engagement device, and a seventh engagement device. The input shaft is rotatably supported in a transmission case and rotatable by power from a driving source. A rotational speed of the input shaft is changeable to any of a plurality of rotational speeds to be output through an output member. The first planetary gear mechanism includes a first sun gear, a first carrier, and a first ring gear which are defined as a first element, a second element, and a third element in a collinear diagram that illustrates a ratio among relative rotational speeds of the first to third elements using straight lines. The first to third elements are arranged in sequence at intervals corresponding to a gear ratio of the first to third elements in the collinear diagram. The second planetary gear mechanism includes a second sun gear, a second carrier, and a second ring gear. The third planetary gear mechanism includes a third sun gear, a third carrier, and a third ring gear. The second sun gear, the second carrier, the second ring gear, the third sun gear, the third carrier, and the third ring gear are defined as first to fourth rotational elements in the collinear diagram that illustrates a ratio among relative rotational speeds of the first to fourth rotational elements using straight lines. The first to fourth rotational elements are arranged in sequence from one side in the collinear diagram. The fourth planetary gear mechanism includes a fourth sun gear, a fourth carrier, and a fourth ring gear which are defined as a fourth element, a fifth element, and a sixth element in the collinear diagram that illustrates a ratio among relative rotational speeds of the fourth to sixth elements using straight lines. The fourth to sixth elements are arranged in sequence at intervals corresponding to a gear ratio of the fourth to sixth elements in the collinear diagram. The third element and the second rotational element are connected to each other to form a first connected member. The sixth element and the third rotational element are connected to each other to form a second connected member. The first element is connected to the input shaft. The fourth element is connected to the output member. The first engagement device is switchable between an engagement state where the first element is connected to the fifth element and a release state where the first element is disconnected from the fifth element. The second engagement device is switchable between an engagement state where the second element is connected to the first rotational element and a release state where the second element is disconnected from the first rotational element. The third engagement device is switchable between an engagement state where the second element is connected to the fifth element and a release state where the second element is disconnected from the fifth element. The fourth engagement device is switchable between an engagement state where the first connected member is connected to the transmission case and a release state where the first connected member is disconnected from the transmission case. The fifth engagement device is switchable between an engagement state where the fourth rotational element is connected to the transmission case and a release state where the fourth rotational element is disconnected from the transmission case. The sixth engagement device is switchable between an engagement state where the fifth element is connected to the transmission case and a release state where the fifth element is disconnected from the transmission case. The seventh engagement device is switchable between an engagement state where one of the first rotational element and the second element is connected to the transmission case and a release state where one of the first rotational element and the second element is disconnected from the transmission case. Ten forward gears of the automatic transmission are established by bringing at least three of the first to seventh engagement devices into the engagement state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
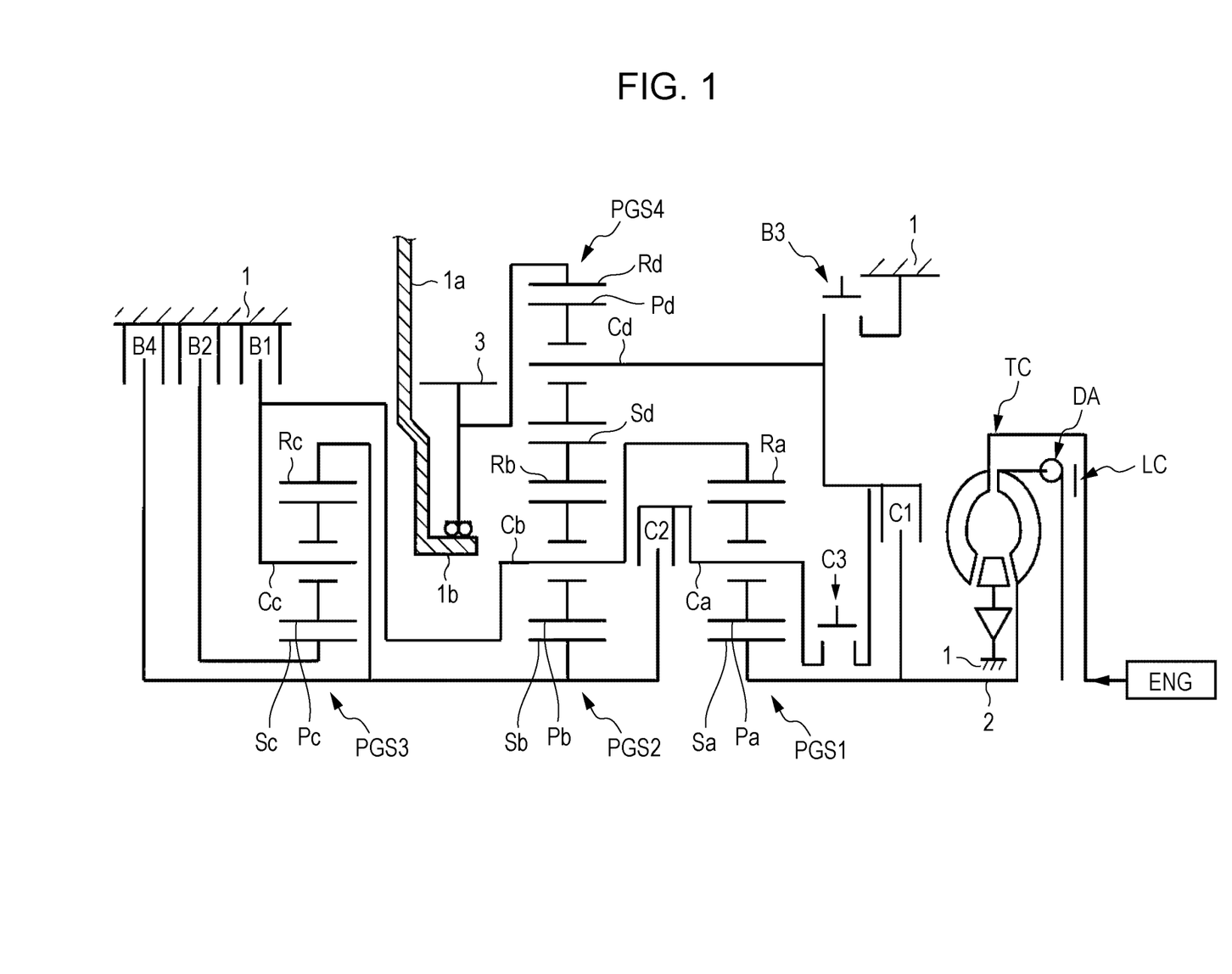
FIG. 1 is a skeleton diagram that illustrates an upper half portion of an automatic transmission according to a first embodiment.

FIG. 1 illustrates an automatic transmission according to a first embodiment. The automatic transmission according to the first embodiment includes an input shaft 2 rotatably supported in a transmission case 1 and configured to receive a driving force output from a driving source ENG of, for example, an internal combustion engine (not depicted) through a torque converter TC including a lock-up clutch LC and a damper DA, and an output member 3 including an output gear arranged coaxially with the input shaft 2. The rotation of the output member 3 is transferred to right and left driving wheels of a vehicle through a differential gear and a propeller shaft (not depicted). In place of the torque converter TC, a frictionally engageable single-plate or multi-plate starting clutch may be disposed.

Four planetary gear mechanisms consisting of first to fourth planetary gear mechanisms PGS1 to PGS4 are arranged coaxially with the input shaft 2 in the transmission case 1. The first planetary gear mechanism PGS1 is a single-pinion planetary gear mechanism that includes a sun gear Sa, a ring gear Ra, and a carrier Ca supporting a pinion Pa meshing with the sun gear Sa and ring gear Ra such that it is rotatable about its axis and about the sun gear Sa. This single-pinion planetary gear mechanism is also called a minus planetary gear mechanism or negative planetary gear mechanism because when the carrier is fixed the sun gear and ring gear rotate in different directions. When the ring gear is fixed the sun gear and carrier rotate in the same direction.

Figure 2:
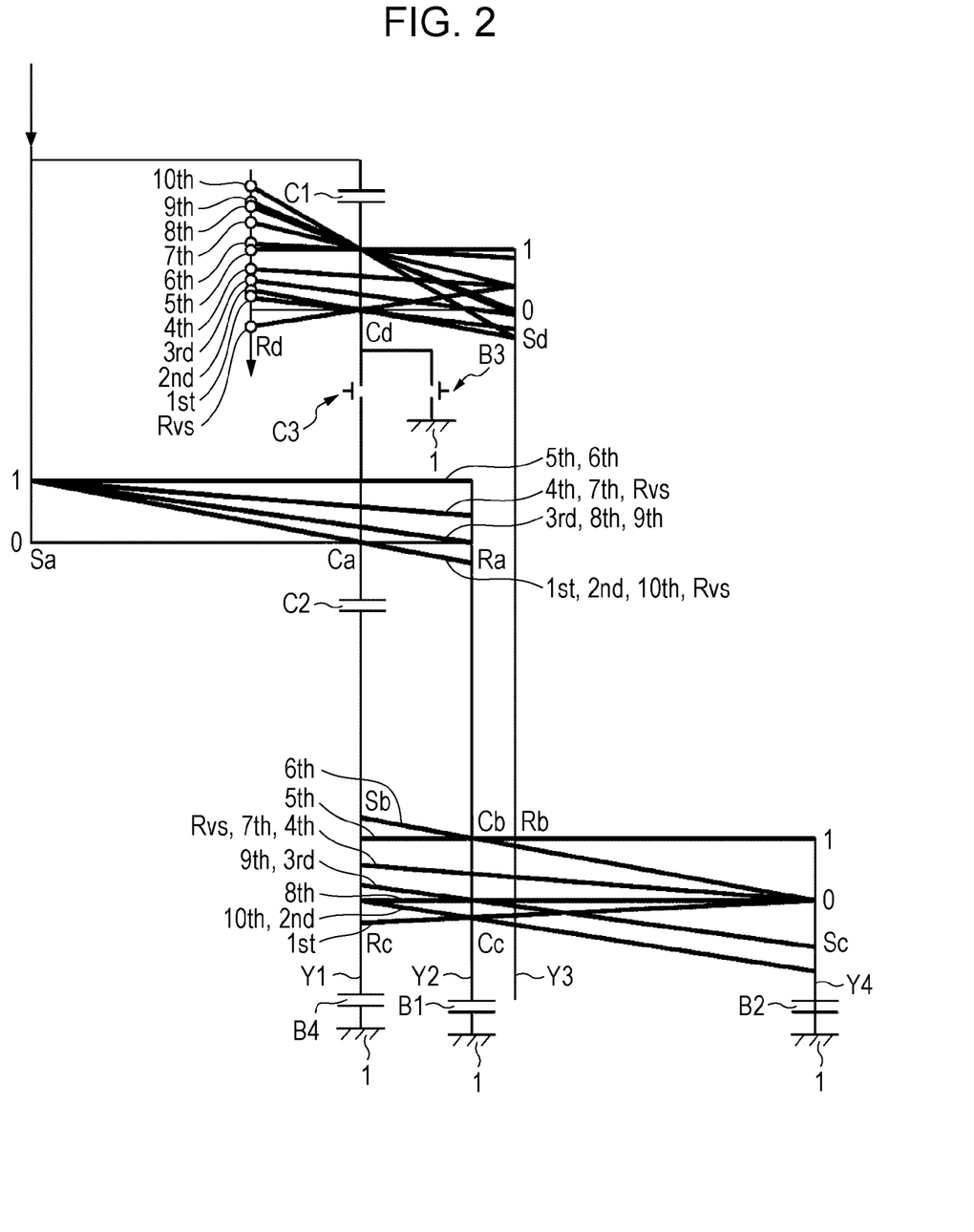
FIG. 2 is a collinear diagram that illustrates a ratio among relative speeds of elements of first to fourth planetary gear mechanisms in the automatic transmission according to the first embodiment.

Referring to the collinear diagram (diagram that illustrates a ratio among relative rotational speeds of the three elements consisting of the sun gear, carrier, and ring gear using straight lines (speed lines)) for the first planetary gear mechanism PGS1 depicted in the middle stage in FIG. 2, when the three elements Sa, Ca, and Ra of the first planetary gear mechanism PGS1 are arranged at intervals corresponding to the gear ratio (the number of teeth of the ring gear/the number of teeth of the sun gear) and they are defined as a first element, a second element, and a third element in sequence from the left, the first element is the sun gear Sa, the second element is the carrier Ca, and the third element is the ring gear Ra.

Here, the ratio of the interval between the sun gear Sa and carrier Ca to the interval between the carrier Ca and ring gear Ra is set at h:1, where h represents the gear ratio of the first planetary gear mechanism PGS1. In the collinear diagram, the lower horizontal line indicates that the rotational speed is "0," and the upper horizontal line indicates that the rotational speed is "1," which is the same as the rotational speed of the input shaft 2.

The fourth planetary gear mechanism PGS4 is also a single-pinion planetary gear mechanism that includes a sun gear Sd, a ring gear Rd, and a carrier Cd supporting a pinion Pd meshing with the sun gear Sd and ring gear Rd such that it is rotatable about its axis and about the sun gear Sd.

Referring to the collinear diagram for the fourth planetary gear mechanism PGS4 depicted in the upper stage in FIG. 2, when the three elements Sd, Cd, and Rd of the fourth planetary gear mechanism PGS4 are arranged at intervals corresponding to the gear ratio and they are defined as a fourth element, a fifth element, and a sixth element in sequence from the left, the fourth element is the ring gear Rd, the fifth element is the carrier Cd, and the sixth element is the sun gear Sd. The ratio of the interval between the sun gear Sd and carrier Cd to the interval between the carrier Cd and ring gear Rd is set at k:1, where k represents the gear ratio of the fourth planetary gear mechanism PGS4.

The second planetary gear mechanism PGS2 is also a single-pinion planetary gear mechanism that includes a sun gear Sb, a ring gear Rb, and a carrier Cb supporting a pinion Pb meshing with the sun gear Sb and ring gear Rb such that it is rotatable about its axis and about the sun gear Sb.

The third planetary gear mechanism PGS3 is also a single-pinion planetary gear mechanism that includes a sun gear Sc, a ring gear Rc, and a carrier Cc supporting a pinion Pc meshing with the sun gear Sc and ring gear Rc such that it is rotatable about its axis and about the sun gear Sc.

The second planetary gear mechanism PGS2 and third planetary gear mechanism PGS3 form four rotational elements by coupling two of the three elements consisting of the sun gear Sb, carrier Cb, and ring gear Rb in the second planetary gear mechanism PGS2 to two of the three elements consisting of the sun gear Sc, carrier Cc, and ring gear Rc in the third planetary gear mechanism PGS3, respectively.

Referring to the collinear diagram for the second planetary gear mechanism PGS2 and third planetary gear mechanism PGS3 depicted in the lower stage in FIG. 2, when the rotational elements are defined as a first rotational element Y1, a second rotational element Y2, a third rotational element Y3, and a fourth rotational element Y4 in sequence from the left, the first rotational element Y1 is the one in which the sun gear Sb in the second planetary gear mechanism PGS2 and the ring gear Rc in the third planetary gear mechanism PGS3 are coupled, the second rotational element Y2 is the one in which the carrier Cb in the second planetary gear mechanism PGS2 and the carrier Cc in the third planetary gear mechanism PGS3 are coupled, the third rotational element Y3 is the ring gear Rb in the second planetary gear mechanism PGS2, and the fourth rotational element Y4 is the sun gear Sc in the third planetary gear mechanism PGS3.

In the collinear diagram for the second planetary gear mechanism PGS2 and third planetary gear mechanism PGS3, the lower horizontal line indicates that the rotational speed is "0," and the upper horizontal line indicates that the rotational speed is "1," which is the same as the rotational speed of the input shaft.

The ratio among the intervals of the first to fourth rotational elements is i:1:(ij−1), where i denotes the gear ratio (the number of teeth of the ring gear/the number of teeth of the sun gear) of the second planetary gear mechanism PGS2 and j denotes the gear ratio of the third planetary gear mechanism PGS3.

The ring gear Ra (third element) in the first planetary gear mechanism PGS1 and the second rotational element Y2 being coupled to each other forms a first connected member Ra-Y2. The sun gear Sd (sixth element) in the fourth planetary gear mechanism PGS4 and the third rotational element Y3 being coupled to each other forms a second connected member Sd-Y3. The sun gear Sa (first element) in the first planetary gear mechanism PGS1 is coupled to the input shaft 2. The ring gear Rd (fourth element) in the fourth planetary gear mechanism PGS4 is coupled to the output member 3 serving as the output gear.

The automatic transmission according to the first embodiment includes, as the engagement mechanisms, three clutches consisting of first to third clutches C1 to C3 and four brakes consisting of first to fourth brakes B1 to B4. The first clutch C1 is a frictional engagement wet multi-plate clutch and is switchable between a coupling state where coupling between the sun gear Sa (first element) in the first planetary gear mechanism PGS1 and the carrier Cd (fifth element) in the fourth planetary gear mechanism PGS4 is made and a release state where the coupling is released.

The second clutch C2 is a frictional engagement wet multi-plate clutch and is switchable between a coupling state where coupling between the carrier Ca (second element) in the first planetary gear mechanism PGS1 and the first rotational element Y1 is made and a release state where the coupling is released. The third clutch C3 is a meshing mechanism including a dog clutch or a synchromesh mechanism having the synchronizing function and is switchable between a coupling state where coupling between the carrier Ca (second element) in the first planetary gear mechanism PGS1 and the carrier Cd (fifth element) in the fourth planetary gear mechanism PGS4 is made and a release state where the coupling is released. The third clutch C3 may be a frictional engagement wet multi-plate clutch.

The first brake B1 is a frictional engagement wet multi-plate clutch and is switchable between a fixing state where fixing of the first connected member Ra-Y2 to the transmission case 1 is made and a release state where the fixing is released. The second brake B2 is a frictional engagement wet multi-plate clutch and is switchable between a fixing state where fixing of the fourth rotational element Y4 to the transmission case 1 is made and a release state where the fixing is released.

The third brake B3 is a meshing mechanism including a dog clutch or a synchromesh mechanism having the synchronizing function and is switchable between a fixing state where fixing of the carrier Cd (fifth element) in the fourth planetary gear mechanism PGS4 to the transmission case 1 is made and a release state where the fixing is released. The third brake B3 may be a wet multi-plate clutch.

The fourth brake B4 is a frictional engagement wet multi-plate brake and is switchable between a fixing state where fixing of the first rotational element Y1 to the transmission case 1 is made and a release state where the fixing is released. The fourth brake B4 may be able to fix the carrier Ca (second element) in the first planetary gear mechanism PGS1 to the transmission case 1.

The state of each of the clutches C1 to C3 and brakes B1 to B4 is switchable by a transmission control unit (not depicted) on the basis of vehicle information, such as a running speed.

The fourth planetary gear mechanism PGS4 is arranged outside in the radial direction of the second planetary gear mechanism PGS2. The ring gear Rb (third rotational element Y3) in the second planetary gear mechanism PGS2 and the sun gear Sd (sixth element) in the fourth planetary gear mechanism PGS4 being integrally coupled to each other forms the second connected member Sd-Y3. Because of the arrangement of the fourth planetary gear mechanism PGS4 outside in the radial direction of the second planetary gear mechanism PGS2, the second planetary gear mechanism PGS2 and fourth planetary gear mechanism PGS4 overlap each other in the radial direction, and the axial length of the automatic transmission can be reduced.

The second planetary gear mechanism PGS2 and fourth planetary gear mechanism PGS4 overlap each other at least in part in the radial direction, and this can lead to a reduced axial length. When they fully overlap each other in the radial direction, the axial length can be minimized.

The first clutch C1, third clutch C3, first planetary gear mechanism PGS1, second clutch C2, second planetary gear mechanism PGS2, output member 3 serving as the output gear, third planetary gear mechanism PGS3, first brake B1, second brake B2, and fourth brake B4 are arranged in this order from the side where the driving source ENG and torque converter TC are present along the axis of the input shaft 2. The third brake B3 is arranged outside in the radial direction of the third clutch C3. The fourth planetary gear mechanism PGS4 is arranged outside in the radial direction of the second planetary gear mechanism PGS2.

Thus, all the four brakes consisting of the first to fourth brakes B1 to B4 are arranged on end portions in the transmission case 1 along the axial direction of the input shaft 2. The planetary gear mechanisms and clutches are not a serious obstruction, and the degree of freedom in the design of the oil passage for the brakes is improved.

The transmission case 1 is provided with a side wall 1a extending internally in the radial direction between the output member 3 and the third planetary gear mechanism PGS3. The side wall 1a is provided with a cylindrical portion 1b extending internally in the radial direction of the output member 3. The output member 3 is supported by the cylindrical portion 1b with a bearing disposed therebetween. This configuration enables the output member 3 to be securely supported by the cylindrical portion 1b having a high mechanical strength linked to the transmission case 1.

The first brake B1 may be disposed on the inner surface of the cylindrical portion 1b, and the second brake B2 may be arranged outside in the radial direction of the third planetary gear mechanism PGS3. In this case, the axial length of the automatic transmission can be reduced.

How each gear in the automatic transmission according to the first embodiment is established is described below with reference to FIGS. 2 and 3A to 3D.

Figure 3A:
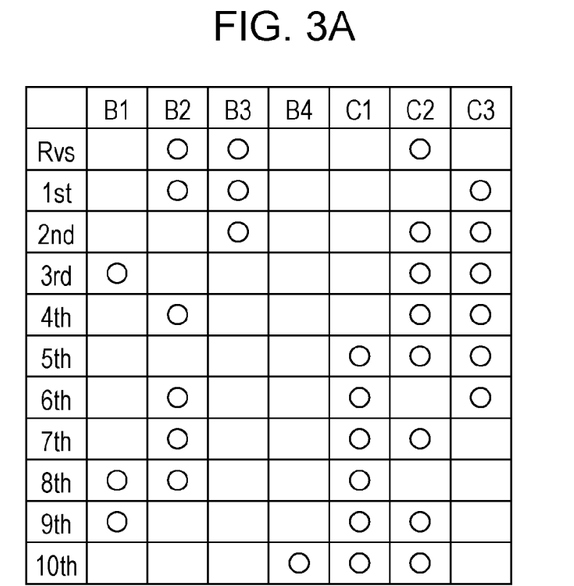
FIG. 3A illustrates a state of each engagement mechanism for each gear in the automatic transmission according to the first embodiment.

To establish the first gear, the third clutch C3 is brought into the coupling state, and the second brake B2 and third brake B3 are brought into the fixing state. The fixing state of the second brake B2 causes the rotational speed of the fourth rotational element Y4 to be "0". The fixing state of the third brake B3 causes the rotational speed of the carrier Cd (fifth element) in the fourth planetary gear mechanism PGS4 to be "0".

The coupling state of the third clutch C3 causes the carrier Ca (second element) in the first planetary gear mechanism PGS1 to be "0", which is the same as the rotational speed of the carrier Cd (fifth element) in the fourth planetary gear mechanism PGS4. The rotational speed of the ring gear Rd (fourth element) in the fourth planetary gear mechanism PGS4 coupled to the output member 3 corresponds to "1st" illustrated in FIG. 2, and the first gear is established.

To establish the second gear, the second clutch C2 and third clutch C3 are brought into the coupling state, and the third brake B3 is brought into the fixing state. The fixing state of the third brake B3 causes the rotational speed of the carrier Cd (fifth element) in the fourth planetary gear mechanism PGS4 to be "0." The coupling state of the third clutch C3 causes the rotational speed of the carrier Ca (second element) in the first planetary gear mechanism PGS1 to be "0," which is the same as the rotational speed of the carrier Cd (fifth element) in the fourth planetary gear mechanism PGS4. The coupling state of the second clutch C2 causes the rotational speed of the first rotational element Y1 to be "0," which is the same as the rotational speed of the carrier Ca (second element) in the first planetary gear mechanism PGS1. The rotational speed of the ring gear Rd (fourth element) in the fourth planetary gear mechanism PGS4 coupled to the output member 3 corresponds to "2nd" illustrated in FIG. 2, and the second gear is established.

To establish the third gear, the second clutch C2 and third clutch C3 are brought into the coupling state, and the first brake B1 is brought into the fixing state. The coupling state of the second clutch C2 and third clutch C3 causes the carrier Ca (second element) in the first planetary gear mechanism PGS1, the first rotational element Y1, and the carrier Cd (fifth element) in the fourth planetary gear mechanism PGS4 to rotate at the same speed. The fixing state of the first brake B1 causes the rotational speed of the first connected member Ra-Y2 to be "0." The rotational speed of the ring gear Rd (fourth element) in the fourth planetary gear mechanism PGS4 coupled to the output member 3 corresponds to "3rd" illustrated in FIG. 2, and the third gear is established.

To establish the fourth gear, the second clutch C2 and third clutch C3 are brought into the coupling state, and the second brake B2 is brought into the fixing state. The coupling state of the second clutch C2 and third clutch C3 causes the carrier Ca (second element) in the first planetary gear mechanism PGS1, the first rotational element Y1, and the carrier Cd (fifth element) in the fourth planetary gear mechanism PGS4 to rotate at the same speed. The fixing state of the second brake B2 causes the rotational speed of the fourth rotational element Y4 to be "0." The rotational speed of the ring gear Rd (fourth element) in the fourth planetary gear mechanism PGS4 coupled to the output member 3 corresponds to "4th" illustrated in FIG. 2, and the fourth gear is established.

To establish the fifth gear, the first clutch C1, second clutch C2, and third clutch C3 are brought into the coupling state. The coupling state of the three clutches of from the first to third clutches C1, C2, and C3 brings the four planetary gear mechanisms consisting of the first to fourth planetary gear mechanisms PGS1 to PGS4 into a locked state where relative rotation of the elements consisting of the sun gear, carrier, and ring gear in each planetary gear mechanism is disabled, and the rotation speed of each of all of the elements is "1." The rotational speed of the ring gear Rd (fourth element) in the fourth planetary gear mechanism PGS4 coupled to the output member 3 corresponds to "5th," which is "1," and the fifth gear is established.

To establish the sixth gear, the first clutch C1 and third clutch C3 are brought into the coupling state, and the second brake B2 is brought into the fixing state. The coupling state of the first clutch C1 causes the rotational speed of the carrier Cd (fifth element) in the fourth planetary gear mechanism PGS4 to be "1," which is the same as the rotational speed of the sun gear Sa (first element) in the first planetary gear mechanism PGS1.

The coupling state of the third clutch C3 causes the rotational speed of the carrier Ca (second element) in the first planetary gear mechanism PGS1 to be "1," which is the same as the rotational speed of the carrier Cd (fifth element) in the fourth planetary gear mechanism PGS4. The fixing state of the second brake B2 causes the rotational speed of the fourth rotational element Y4 to be "0." The rotational speed of the ring gear Rd (fourth element) in the fourth planetary gear mechanism PGS4 coupled to the output member 3 corresponds to "6th" illustrated in FIG. 2, and the sixth gear is established.

To establish the seventh gear, the first clutch C1 and second clutch C2 are brought into the coupling state, and the second brake B2 is brought into the fixing state. The coupling state of the first clutch C1 causes the rotational speed of the carrier Cd (fifth element) in the fourth planetary gear mechanism PGS4 to be "1," which is the same as the rotational speed of the sun gear Sa (first element) in the first planetary gear mechanism PGS1.

The coupling state of the second clutch C2 causes the carrier Ca (second element) in the first planetary gear mechanism PGS1 and the first rotational element Y1 to rotate at the same speed. The fixing state of the second brake B2 causes the rotational speed of the fourth rotational element Y4 to be "0." The rotational speed of the ring gear Rd (fourth element) in the fourth planetary gear mechanism PGS4 coupled to the output member 3 corresponds to "7th" illustrated in FIG. 2, and the seventh gear is established.

To establish the eighth gear, the first clutch C1 is brought into the coupling state, and the first brake B1 and second brake B2 are brought into the fixing state. The fixing state of the first brake B1 and second brake B2 causes the rotational speed of each of the second rotational element Y2 and fourth rotational element Y4 to be "0." This results in the locked state where relative rotation of the four rotational elements consisting of the first to fourth rotational elements Y1 to Y4 is disabled, and the rotational speed of the third rotational element Y3, that is, the second connected member Sd-Y3 is also "0."

The coupling state of the first clutch C1 causes the carrier Cd (fifth element) in the fourth planetary gear mechanism PGS4 to be "1," which is the same as the rotational speed of the sun gear Sa (first element) in the first planetary gear mechanism PGS1. The rotational speed of the ring gear Rd (fourth element) in the fourth planetary gear mechanism PGS4 coupled to the output member 3 corresponds to "8th" illustrated in FIG. 2, and the eighth gear is established.

To establish the ninth gear, the first clutch C1 and second clutch C2 are brought into the coupling state, and the first brake B1 is brought into the fixing state. The coupling state of the first clutch C1 causes the rotational speed of the carrier Cd (fifth element) in the fourth planetary gear mechanism PGS4 to be "1," which is the same as the rotational speed of the sun gear Sa (first element) in the first planetary gear mechanism PGS1.

The coupling state of the second clutch C2 causes the carrier Ca (second element) in the first planetary gear mechanism PGS1 and the first rotational element Y1 to rotate at the same speed. The fixing state of the first brake B1 causes the rotational speed of the first connected member Ra-Y2 to be "0." The rotational speed of the ring gear Rd (fourth element) in the fourth planetary gear mechanism PGS4 coupled to the output member 3 corresponds to "9th" illustrated in FIG. 2, and the ninth gear is established.

To establish the tenth gear, the first clutch C1 and second clutch C2 are brought into the coupling state, and the fourth brake B4 is brought into the fixing state. The coupling state of the first clutch C1 causes the rotational speed of the carrier Cd (fifth element) in the fourth planetary gear mechanism PGS4 to be "1," which is the same as the rotational speed of the sun gear Sa (first element) in the first planetary gear mechanism PGS1.

The coupling state of the second clutch C2 causes the carrier Ca (second element) in the first planetary gear mechanism PGS1 and the first rotational element Y1 to rotate at the same speed. The fixing state of the fourth brake B4 causes the rotational speed of the first rotational element Y1 to be "0," and thus the rotational speed of the carrier Ca (second element) in the first planetary gear mechanism PGS1 coupled by the second clutch C2 is also "0." The rotational speed of the ring gear Rd (fourth element) in the fourth planetary gear mechanism PGS4 coupled to the output member 3 corresponds to "10th" illustrated in FIG. 2, and the tenth gear is established.

To establish the reverse gear, the second clutch C2 is brought into the coupling state, and the second brake B2 and third brake B3 are brought into the fixing state. The coupling state of the second clutch C2 causes the carrier Ca (second element) in the first planetary gear mechanism PGS1 and the first rotational element Y1 to rotate at the same speed. The fixing state of the second brake B2 causes the rotational speed of the fourth rotational element Y4 to be "0." The fixing state of the third brake B3 causes the carrier Cd (fifth element) in the fourth planetary gear mechanism PGS4 to be "0." The rotational speed of the ring gear Rd (fourth element) in the fourth planetary gear mechanism PGS4 coupled to the output member 3 corresponds to "Rvs" indicating reverse rotation (rotation along in a direction in which a vehicle moves backward) illustrated in FIG. 2, and the reverse gear is established.

FIG. 3A illustrates the states of the clutches C1 to C3 and brakes B1 to B4 at each gear in table form. In the columns of the clutches C1 to C3 and brakes B1 to B4 in this table, "O" indicates a coupling state or fixing state, and a blank field indicates a release state.

Figure 3B:
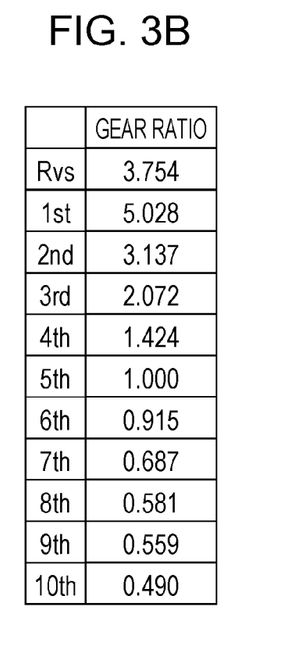
FIG. 3B illustrates an example of a gear ratio at each gear according to the first embodiment.
Figure 3C:
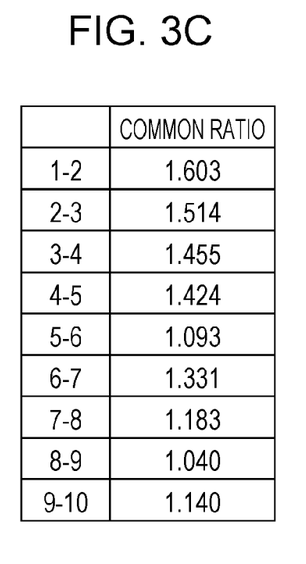
FIG. 3C illustrates an example of a common ratio between gear ratios of neighboring gears according to the first embodiment.
Figure 3D:
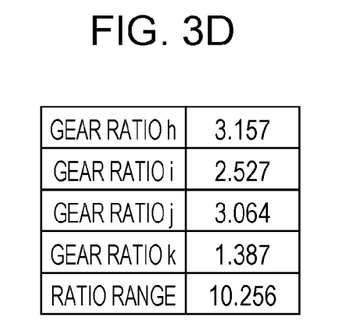
FIG. 3D illustrates an example of a gear ratio of each planetary gear mechanism and a ratio range of the automatic transmission according to the first embodiment.

FIG. 3B illustrates a gear ratio (rotational speed of the input shaft 2/rotational speed of the output member 3) at each gear when the gear ratio h of the first planetary gear mechanism PGS1 is 3.157, the gear ratio i of the second planetary gear mechanism PGS2 is 2.527, the gear ratio j of the third planetary gear mechanism PGS3 is 3.064, and the gear ratio k of the fourth planetary gear mechanism PGS4 is 1.387, as illustrated in FIG. 3D. With this, the common ratios (ratios between the gear ratios at neighboring gears) are appropriate, as illustrated in FIG. 3C, and the ratio range (gear ratio at the first gear/gear ratio at the tenth gear) illustrated in FIG. 3D is also appropriate.

With the automatic transmission according to the first embodiment, 10 forward and 1 reverse gears can be made. The number of opened wet multi-plate clutches and wet multi-plate brakes at each gear is at or below four, the friction loss can be suppressed, and efficiency of transferring a driving force can be improved.

When the sixth gear is defined as a predetermined medium-speed gear, the first gear through the sixth gear, which is the predetermined medium-speed gear, are defined as a low-speed gear range, and the seventh gear, which exceeds the sixth gear, which is the predetermined medium-speed gear, through the tenth gear are defined as a high-speed gear range, in the high-speed gear range, which is at or above the seventh gear, which exceeds the sixth gear, which is the predetermined medium-speed gear, the third clutch C3 is in a release state. The third clutch C3 is a meshing mechanism having a friction loss smaller than that of a frictional engagement wet multi-plate clutch.

The third brake B3, which is in a release state at the third through tenth gears, is also a meshing mechanism. Accordingly, in the high-speed gear range, the number of opened wet multi-plate clutches and wet multi-plate brakes is two, a friction loss occurring when a vehicle runs at high speeds can be reduced, and fuel efficiency can be improved.

The third clutch C3, which is a meshing mechanism, is only switched between the coupling state and release state in a shift between the sixth gear, which is the predetermined medium-speed gear, and seventh gear. Because the transfer torque (transfer driving force) in the third clutch C3 at the sixth gear (predetermined medium-speed gear) is relatively small, even if the third clutch C3 is a dog clutch as the meshing mechanism, switching between the fixing state and release state in a shift between the sixth gear and seventh gear can be smoothly performed.

Because all of the planetary gear mechanisms PGS1 to PGS4 is a single-pinion planetary gear mechanism, the number of engagements of the teeth of gears on the transfer path for the driving force can be smaller than that occurring when a double-pinion planetary gear mechanism is used, and transfer efficiency can be improved.

Each of the third clutch C3 and third brake B3 in the first embodiment is a meshing mechanism, as described above. Alternatively, if the third clutch C3 is a frictional engagement wet multi-plate clutch and the third brake B3 is a frictional engagement wet multi-plate brake, the advantageous effects of being able to suppress the number of opened wet multi-plate clutches and wet multi-plate brakes at each gear at or below four and being able to suppress a friction loss are also obtainable.

The third brake B3 may be a two-way clutch switchable between a fixing state where the carrier Cd (fifth element) in the fourth planetary gear mechanism PGS4 is fixed to the transmission case 1 and a reverse-rotation preventing state where forward rotation of the carrier Cd (fifth element) in the fourth planetary gear mechanism PGS4 is allowed and reverse rotation thereof is prevented. One example of the two-way clutch is illustrated in FIGS. 5A to 5C and specifically described below.

Figure 5A:
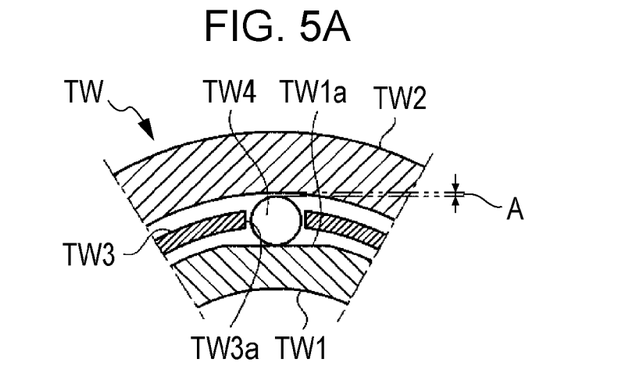
FIGS. 5A to 5C are cross-sectional views that illustrate an example of a two-way clutch as a third brake.
Figure 5B:
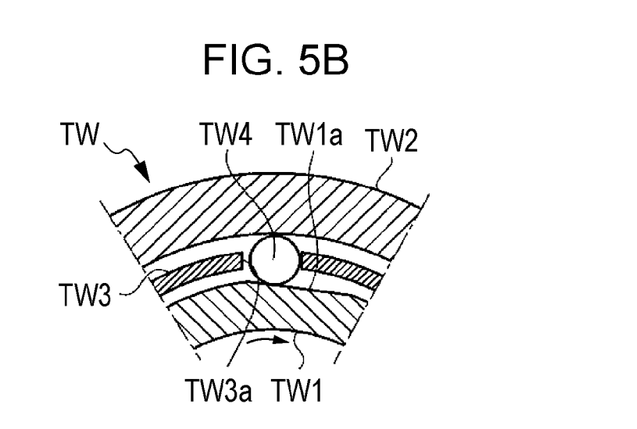
Figure 5C:
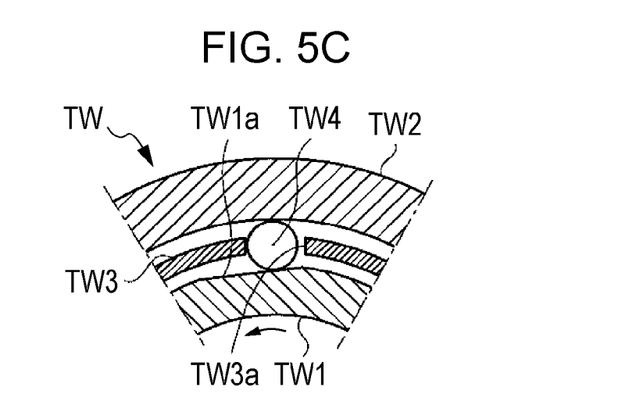

A two-way clutch TW as the third brake B3 illustrated in FIGS. 5A to 5C includes an inner ring TW1 coupled to the carrier Cd (fifth element) in the fourth planetary gear mechanism PGS4, an outer ring TW2, and a holding ring TW3 arranged between the inner ring TW1 and outer ring TW2. The outer ring TW2 is arranged outside in the radial direction of the inner ring TW1, spaced away from the inner ring TW1, and coupled to the transmission case 1.

The inner ring TW1 includes a plurality of cam surfaces TW1a in its outer peripheral surfaces. The holding ring TW3 includes a plurality of holes TW3a corresponding to the cam surfaces TW1a. Each of the holes TW3a houses a roller TW4. The two-way clutch TW includes two electromagnetic clutches consisting of first and second electromagnetic clutches (not illustrated). The first electromagnetic clutch couples the outer ring TW2 and holding ring TW3 by being energized. The holding ring TW3 is configured such that it can rotate with respect to the inner ring TW1 and outer ring TW2 when the first electromagnetic clutch is not energized.

The diameter of the roller TW4 is set such that a space A is present when the roller TW4 is on a central portion of the cam surface TW1a, as illustrated in FIG. 5A, and such that the roller TW4 is in contact with the inner ring TW1 and outer ring TW2 when being on an end portion of the cam surface TW1a, as illustrated in FIGS. 5B and 5C.

Because when the first electromagnetic clutch is not energized the holding ring TW3 can rotate freely, the roller TW4 can remain on the central portion of the cam surface TW1a, as illustrated in FIG. 5A. Accordingly, the two-way clutch TW is in a state where the inner ring TW1 can rotate freely.

When the first electromagnetic clutch is energized the holding ring TW3 is fixed to the transmission case 1 with the outer ring TW2 disposed therebetween. In this case, when the inner ring TW1 attempts to rotate forward or backward, because the holding ring TW3 is fixed, the roller TW4 is positioned on an end portion of the cam surface TW1a, as illustrated in FIGS. 5B and 5C.

At this time, the roller TW4 is sandwiched between the cam surface TW1a and the inner surface of the outer ring TW2, and the rotation of the inner ring TW1 is prevented. That is, the two-way clutch TW is in the fixing state.

The second electromagnetic clutch is switchable among a first state where, while the hole TW3a is positioned directly above a first end portion of the cam surface TW1a, the holding ring TW3 is coupled to the inner ring TW1, as illustrated in FIG. 5B, a second state where, while the hole TW3a is positioned directly above a second end portion of the cam surface TW1a, the holding ring TW3 is coupled to the inner ring TW1, as illustrated in FIG. 5C, and a release state where the holding ring TW3 and inner ring TW1 are decoupled.

When the clockwise direction in FIGS. 5A to 5C is a reverse direction, the two-way clutch TW is brought into the reverse-rotation preventing state by decoupling the outer ring TW2 and the holding ring TW3 as the state where the first electromagnetic clutch is not energized (energization-off state) and bringing the second electromagnetic clutch into the first state.

When the third brake B3 is the above-described two-way clutch TW, each gear can be established by the two-way clutch TW becoming the fixing state at the forward first to second gears and the reverse gear and becoming the reverse-rotation preventing state at the forward third through tenth gears.

When the third brake B3 is the above-described two-way clutch, no friction loss occurs in the third brake B3, unlike when the third brake B3 is a frictional engagement brake. Accordingly, a friction loss can be suppressed in the automatic transmission as a whole, as in the case where the third brake B3 is a meshing mechanism.

When it is estimated that the gear is to be shifted up into third during running at the second gear on the basis of vehicle information, such as a running speed, the transmission control unit (not depicted) may preferably switch in advance the two-way clutch TW as the third brake B3 to the reverse-rotation preventing state.

With this, in shifting up the gear from second to third, the switching of the state of the two-way clutch TW as the third brake B3 has been completed, and the third gear can be achieved simply by bringing the first brake B1 into the fixing state. Thus, the gear can be shifted up from second to third smoothly, and controllability for changing the speed in the automatic transmission can be improved.

The two-way clutch TW having the above-described configuration is also switchable to a release state where fixing of the carrier Cd (fifth element) in the fourth planetary gear mechanism PGS4 to the transmission case 1 is released and a forward-rotation preventing state where forward rotation of the carrier Cd (fifth element) in the fourth planetary gear mechanism PGS4 is prevented and reverse rotation thereof is allowed, in addition to the above-described fixing state and reverse-rotation preventing state.

Specifically, when the first electromagnetic clutch is brought into the energization-off state and the second electromagnetic clutch is brought into the release state, the two-way clutch TW becomes the state where the roller TW4 remains on the central portion of the cam surface TW1a and the state where the inner ring TW1 can rotate freely with respect to the outer ring TW2, that is, the release state, as illustrated in FIG. 5A.

When the first electromagnetic clutch is brought into the energization-off state and the second electromagnetic clutch is brought into the second state where, while the hole TW3a is positioned directly above the second end of the cam surface TW1a, the holding ring TW3 is coupled to the inner ring TW1, as illustrated in FIG. 5C, the two-way clutch TW becomes the state where forward rotation of the inner ring TW1 is prevented and reverse rotation thereof is allowed, that is, the forward-rotation preventing state.

Accordingly, the second electromagnetic clutch in the above-described two-way clutch TW may be omitted, and the two-way clutch TW as the third brake B3 may be only switchable between the fixing state and release state by switching of the first electromagnetic clutch. In this case, each gear can be established by making the two-way clutch TW be in the fixing state at from the forward first to second gear and the reverse gear and be switched to the release state at from the third through tenth gear.

The third clutch C3 may be configured using the above-described two-way clutch TW so as to be switchable between a coupling state where the carrier Ca (second element) in the first planetary gear mechanism PGS1 and the carrier Cd (fifth element) in the fourth planetary gear mechanism PGS4 are coupled and a release state where the coupling is released.

The 10 forward gears are described in the first embodiment. However, the automatic transmission may achieve gears other than the 10 forward gears. For example, three gears consisting of the second, sixth, and eighth gears in the first embodiment may be omitted, and seven forward gears may be achieved.

Second Embodiment

Figure 4:
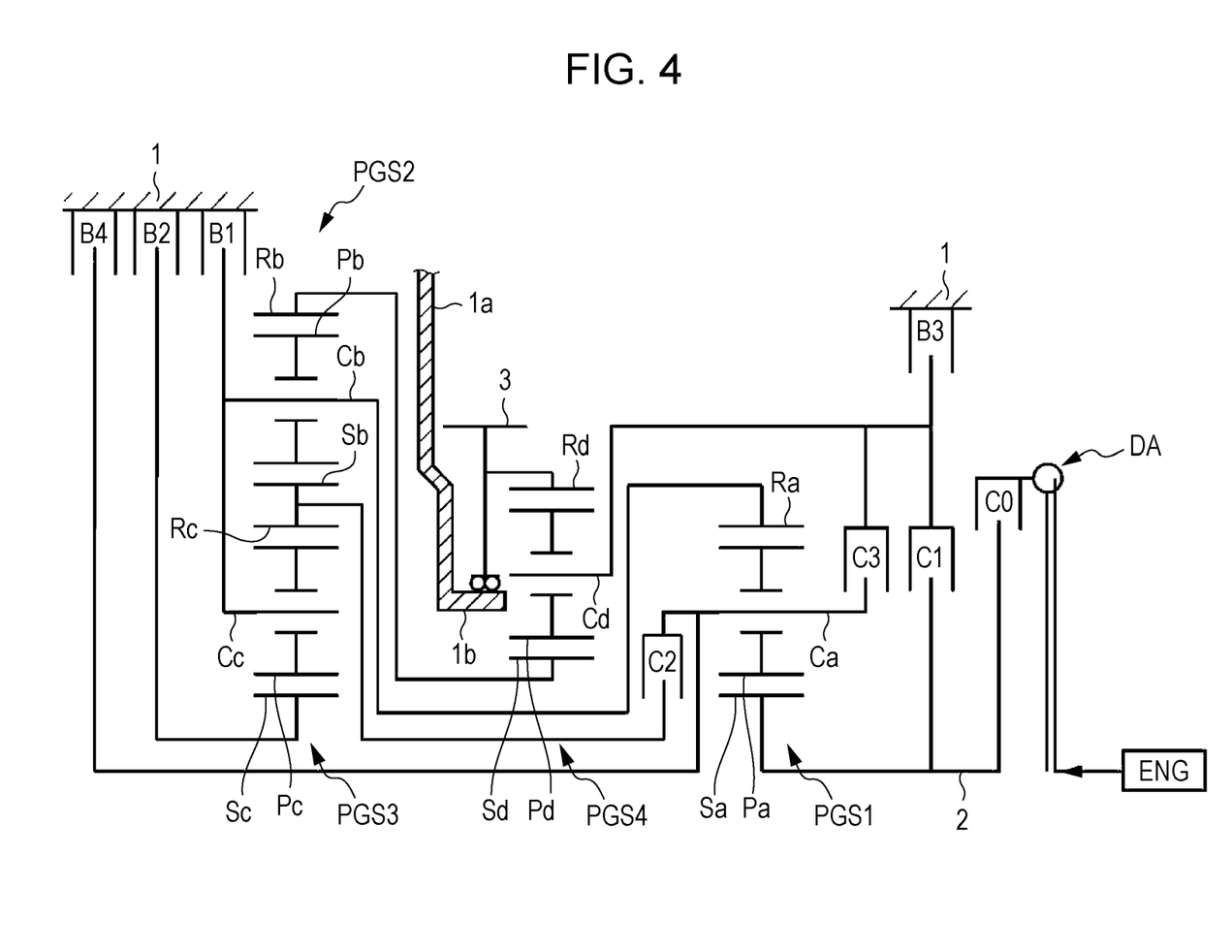
FIG. 4 is a skeleton diagram that illustrates an upper half portion of the automatic transmission according to a second embodiment.

FIG. 4 illustrates the automatic transmission according to a second embodiment. The automatic transmission according to the second embodiment includes a frictional engagement starting clutch C0, in place of the torque converter in the first embodiment. A driving force of the driving source ENG is transferred to the input shaft 2 through the damper DA and starting clutch C0.

The second planetary gear mechanism PGS2 according to the second embodiment is arranged outside in the radial direction of the third planetary gear mechanism PGS3. The sun gear Sb in the second planetary gear mechanism PGS2 and the ring gear Rc in the third planetary gear mechanism PGS3 are integrally coupled to each other and form the first rotational element Y1. Because of the arrangement of the second planetary gear mechanism PGS2 outside in the radial direction of the third planetary gear mechanism PGS3, the second planetary gear mechanism PGS2 and third planetary gear mechanism PGS3 overlap each other in the radial direction, and the axial length of the automatic transmission can be reduced.

The second planetary gear mechanism PGS2 and third planetary gear mechanism PGS3 overlap each other at least in part in the radial direction, and this can lead to a reduced axial length. When they fully overlap each other in the radial direction, the axial length can be minimized.

The third clutch C3 according to the second embodiment is a frictional engagement wet multi-plate clutch. The third brake B3 according to the second embodiment is a frictional engagement wet multi-plate brake. The fourth brake B4 is a frictional engagement wet multi-plate brake and switchable between a fixing state where fixing of the carrier Ca (second element) in the first planetary gear mechanism PGS1 to the transmission case 1 is made and a release state where the fixing is released. The fourth brake B4 according to the second embodiment may be configured such that the first rotational element Y1 can be fixed to the transmission case 1, as in the first embodiment.

Other components are substantially the same as those in the first embodiment, and the description thereof is omitted by using the same reference numerals. The gears from the first through tenth gears and the reverse gear can be established in substantially the same manner as in the first embodiment.

With the automatic transmission according to the second embodiment, the 10-forward and 1-reverse gears can be achieved, as in the first embodiment, a friction loss can be suppressed, and efficiency of transferring a driving force can be improved. Because all of the planetary gear mechanisms PGS1 to PGS4 is a single-pinion planetary gear mechanism, transfer efficiency can be improved.

Each of the second clutch C2 and third brake B3 in the automatic transmission according to the second embodiment may be a meshing mechanism, as in the first embodiment. The third brake B3 may be a two-way clutch. The automatic transmission may be configured to achieve seven forward gears, as described in the first embodiment.

[1] An automatic transmission according to an embodiment includes an input shaft rotatably supported in a transmission case and rotated by power from a driving source, four planetary gear mechanisms consisting of first to fourth planetary gear mechanisms, and seven engagement mechanisms consisting of first to third clutches and first to fourth brakes. The automatic transmission changes a speed of rotation of the input shaft to any of a plurality of speeds and outputs the rotation through an output member. Each of the first to fourth planetary gear mechanisms includes three elements consisting of a sun gear, a carrier, and a ring gear. The elements of the second and third planetary gear mechanisms form four rotational elements. In a collinear diagram that illustrates a ratio among relative rotational speeds of the four rotational elements using straight lines, the four rotational elements are defined as a first rotational element, a second rotational element, a third rotational element, and a fourth rotational element in sequence from one side. In a collinear diagram that illustrates a ratio among relative rotational speeds of the three elements of the first planetary gear mechanism using straight lines, the three elements arranged at intervals corresponding to a gear ratio thereof are defined as a first element, a second element, and a third element in sequence. In a collinear diagram that illustrates a ratio among relative rotational speeds of the three elements of the fourth planetary gear mechanism using straight lines, the three elements arranged at intervals corresponding to a gear ratio thereof are defined as a fourth element, a fifth element, and a sixth element in sequence. The third element and the second rotational element being coupled to each other forms a first connected member. The sixth element and the third rotational element being coupled to each other forms a second connected member. The first element is coupled to the input shaft. The fourth element is coupled to the output member.

The first clutch is switchable between a coupling state where coupling between the first element and the fifth element is made and a release state where the coupling is released. The second clutch is switchable between a coupling state where coupling between the second element and the first rotational element is made and a release state where the coupling is released. The third clutch is switchable between a coupling state where coupling between the second element and the fifth element is made and a release state where the coupling is released. The first brake is switchable between a fixing state where fixing of the first connected member to the transmission case is made and a release state where the fixing is released. The second brake is switchable between a fixing state where fixing of the fourth rotational element to the transmission case is made and a release state where the fixing is released. The third brake is switchable between a fixing state where fixing of the fifth element to the transmission case is made and a release state where the fixing is released. The fourth brake is switchable between a fixing state where fixing of the first rotational element or the second element to the transmission case is made and a release state where the fixing is released. The automatic transmission establishes 10 forward gears by bringing at least three of the seven engagement mechanisms into the coupling state or the fixing state.

The automatic transmission according to the embodiment can establish 10 forward gears. Three engagement mechanisms out of the seven engagement mechanisms consisting of the three clutches and four brakes are engaged, and they are in the coupling state or fixing state. Thus, the number of engagement mechanisms that are not in the coupling state or fixing state and that are opened at each gear is four. The automatic transmission can increase the number of gears to 10 forward gears without increasing a friction loss caused by the engagement mechanisms, unlike a known automatic transmission in which only up to eight forward gears are established and four engagement mechanisms are opened at each gear. Accordingly, fuel efficiency of a vehicle can be improved by an increased number of gears without decreasing transfer efficiency in the automatic transmission.

[2] In the automatic transmission according to the embodiment, the sixth element may be the sun gear in the fourth planetary gear mechanism, the third rotational element may include at least the ring gear in the second planetary gear mechanism, the fourth planetary gear mechanism may be arranged outside in a radial direction of the second planetary gear mechanism, and the sun gear in the fourth planetary gear mechanism may be integral with the ring gear in the second planetary gear mechanism.

With this configuration of the embodiment, because the fourth planetary gear mechanism is arranged outside in the radial direction of the second planetary gear mechanism, the axial length of the automatic transmission can be reduced.

[3] In the automatic transmission according to the embodiment, in place of the above-described configuration in which the fourth planetary gear mechanism is arranged outside in the radial direction of the second planetary gear mechanism, one of the four rotational elements consisting of the first to fourth rotational elements may be coupled to the sun gear in the second planetary gear mechanism and the ring gear in the third planetary gear mechanism, the second planetary gear mechanism may be arranged outside in a radial direction of the third planetary gear mechanism, and the sun gear in the second planetary gear mechanism may be integral with the ring gear in the third planetary gear mechanism. With this configuration, the axial length of the automatic transmission can also be reduced.

[4] In the automatic transmission according to the embodiment, the third brake may preferably include a meshing mechanism. With this configuration, the friction loss can be further reduced.

[5] In the automatic transmission according to the embodiment, the third brake may include a two-way clutch switchable between a fixing state where the fifth element is fixed to the transmission case and a reverse-rotation preventing state where forward rotation of the fifth element is allowed and reverse rotation thereof is prevented. With this configuration, the friction loss can also be further reduced, and controllability for changing the speed among gears can be improved.

[6] In the automatic transmission according to the embodiment, the third clutch may preferably include a meshing mechanism. With this configuration, the friction loss can be further reduced.

[7] In the automatic transmission according to the embodiment, the third clutch may preferably include a two-way clutch switchable between a coupling state where coupling between the second element and the fifth element is made and a release state where the coupling is released.

With this configuration of the embodiment, the friction loss can also be further reduced, and controllability for changing the speed among gears can be improved.

[8] The automatic transmission according to the embodiment may further include a starting clutch capable of transferring the power from the driving source to the input shaft.

[9] In the automatic transmission according to the embodiment, the power from the driving source may be transferred to the input shaft through a torque converter.

Obviously, numerous modifications and variations of the present invention are possible in light of the above teachings. It is therefore to be understood that within the scope of the appended claims, the invention may be practiced otherwise than as specifically described herein.

What is claimed is:
1. An automatic transmission comprising:
an input shaft rotatably supported in a transmission case and rotatable by power from a driving source, a rotational speed of the input shaft being changeable to any of a plurality of rotational speeds to be output through an output member;
a first planetary gear mechanism including a first sun gear, a first carrier, and a first ring gear which are defined as a first element, a second element, and a third element;
a second planetary gear mechanism including a second sun gear, a second carrier, and a second ring gear;
a third planetary gear mechanism including a third sun gear, a third carrier, and a third ring gear;
a first rotational element including the second sun gear and the third ring gear, a second rotational element including the second carrier and the third carrier, a third rotational element including the second ring gear, and a fourth rotational element including the third sun gear;
a fourth planetary gear mechanism including a fourth ring gear, a fourth carrier, and a fourth sun gear which are defined as a fourth element, a fifth element, and a sixth element;
the third element and the second rotational element being connected to each other to form a first connected member, the sixth element and the third rotational element being connected to each other to form a second con- nected member, the first element being connected to the input shaft, the fourth element being connected to the output member;

a first engagement device switchable between an engagement state where the first element is connected to the fifth element and a release state where the first element is disconnected from the fifth element;

a second engagement device switchable between an engagement state where the second element is connected to the first rotational element and a release state where the second element is disconnected from the first rotational element;

a third engagement device switchable between an engagement state where the second element is connected to the fifth element and a release state where the second element is disconnected from the fifth element;

a fourth engagement device switchable between an engagement state where the first connected member is connected to the transmission case and a release state where the first connected member is disconnected from the transmission case;

a fifth engagement device switchable between an engagement state where the fourth rotational element is connected to the transmission case and a release state where the fourth rotational element is disconnected from the transmission case;

a sixth engagement device switchable between an engagement state where the fifth element is connected to the transmission case and a release state where the fifth element is disconnected from the transmission case;

a seventh engagement device switchable between an engagement state where one of the first rotational element and the second element is connected to the transmission case and a release state where one of the first rotational element and the second element is disconnected from the transmission case; and ten forward gears of the automatic transmission being established by bringing at least three of the first to seventh engagement devices into the engagement state.

2. The automatic transmission according to claim 1, wherein the fourth sun gear is defined as the sixth element, wherein the third rotational element includes at least the second ring gear, wherein the fourth planetary gear mechanism is arranged outside the second planetary gear mechanism in a radial direction of the second planetary gear mechanism, and wherein the fourth sun gear is integral with the second ring gear.

3. The automatic transmission according to claim 1, wherein the first rotational element comprises the second sun gear connected to the third ring gear, wherein the second planetary gear mechanism is arranged outside the third planetary gear mechanism in a radial direction of the third planetary gear mechanism, and wherein the second sun gear is integral with the third ring gear.

4. The automatic transmission according to claim 1, wherein the sixth engagement device comprises a meshing mechanism.

5. The automatic transmission according to claim 1, wherein the sixth engagement device comprises a two-way clutch switchable between an engagement state where the two-way clutch connects the fifth element to the transmission case and a reverse-rotation preventing state where the two-way clutch allows forward rotation of the fifth element and prevents reverse rotation of the fifth element.

6. The automatic transmission according to claim 1, wherein the third engagement device comprises a meshing mechanism.

7. The automatic transmission according to claim 1, wherein the third engagement device comprises a two-way clutch switchable between an engagement state where the second element is connected to the fifth element and a release state where the second element is disconnected from the fifth element.

8. The automatic transmission according to claim 1, further comprising:
a starting clutch to transfer the power from the driving source to the input shaft.

9. The automatic transmission according to claim 1, further comprising:
a torque converter to transfer the power from the driving source to the input shaft.

10. The automatic transmission according to claim 1,
wherein the first sun gear is defined as the first element,
wherein the first carrier is defined as the second element, and
wherein the first ring gear is defined as the third element.

11. The automatic transmission according to claim 1,
wherein the fourth sun gear is defined as the sixth element,
wherein the fourth carrier is defined as the fifth element, and
wherein the fourth ring gear is defined as the fourth element.

12. The automatic transmission according to claim 1,
wherein the second sun gear and the third ring gear are connected to each other to be defined as the first rotational element,
wherein the second carrier and the third carrier are connected to each other to be defined as the second rotational element,
wherein the second ring gear is defined as the third rotational element, and
wherein the third sun gear is defined as the fourth rotational element.

* * * * *